US010261193B2

(12) United States Patent
Kreienkamp et al.

(10) Patent No.: US 10,261,193 B2
(45) Date of Patent: Apr. 16, 2019

(54) SYSTEM AND A METHOD FOR DETERMINING AN IMAGE REJECTION CHARACTERISTIC OF A RECEIVER WITHIN A TRANSCEIVER

(71) Applicant: Intel IP Corporation, Santa Clara, CA (US)

(72) Inventors: Rainer Dirk Kreienkamp, Duesseldorf (DE); Junlin Yan, Duesseldorf (DE); Harald Doppke, Muelheim an der Ruhr (DE); Markus Hammes, Dinslaken (DE)

(73) Assignee: Intel IP Corporation, Santa Clara, CA (US)

( * ) Notice: Subject to any disclaimer, the term of this patent is extended or adjusted under 35 U.S.C. 154(b) by 207 days.

(21) Appl. No.: 15/151,796

(22) Filed: May 11, 2016

(65) Prior Publication Data

US 2016/0377728 A1 Dec. 29, 2016

(30) Foreign Application Priority Data

Jun. 25, 2015 (DE) .......................... 10 2015 110 269

(51) Int. Cl.
*G01S 19/23* (2010.01)
(52) U.S. Cl.
CPC .................... *G01S 19/23* (2013.01)
(58) Field of Classification Search
CPC ...... G01S 19/23; G01S 19/235; G01S 19/258; G01S 19/29; G01S 19/256
USPC ..................................... 342/357.62
See application file for complete search history.

(56) References Cited

U.S. PATENT DOCUMENTS

| | | | |
|---|---|---|---|
| 5,640,692 A | 6/1997 | Bothorel | |
| 6,882,827 B1 | 4/2005 | Collier | |
| 9,237,055 B2 * | 1/2016 | Lin | ..................... H03H 11/1213 |
| 2006/0074558 A1 * | 4/2006 | Williamson | ......... G01C 21/165 |
| | | | 701/469 |
| 2008/0036643 A1 * | 2/2008 | Kiukkonen | ............. G01S 19/29 |
| | | | 342/21 |
| 2015/0280958 A1 * | 10/2015 | Yu | ......................... H04L 27/364 |
| | | | 375/222 |

\* cited by examiner

*Primary Examiner* — Harry K Liu
(74) *Attorney, Agent, or Firm* — Eschweiler & Potashnik, LLC

(57) ABSTRACT

A method for determining an image rejection characteristic of a receiver within a transceiver is provided. The transceiver uses a common local oscillator. The method includes generating a test signal having a spectral peak and generating a local oscillator signal comprising a frequency with an offset from a center frequency of the spectral peak. Further, the method includes down-mixing the test signal in the receiver using the local oscillator signal to generate a down-mixed signal. The method further includes calculating a first value of a signal characteristic of the down-mixed signal in a first frequency range corresponding to a desired signal component of the down-mixed signal and calculating a second value of the signal characteristic of the down-mixed signal in a second frequency range corresponding to an undesired signal component of the down-mixed signal. Further, the method includes comparing the first value and the second value to generate the image rejection characteristic.

25 Claims, 7 Drawing Sheets

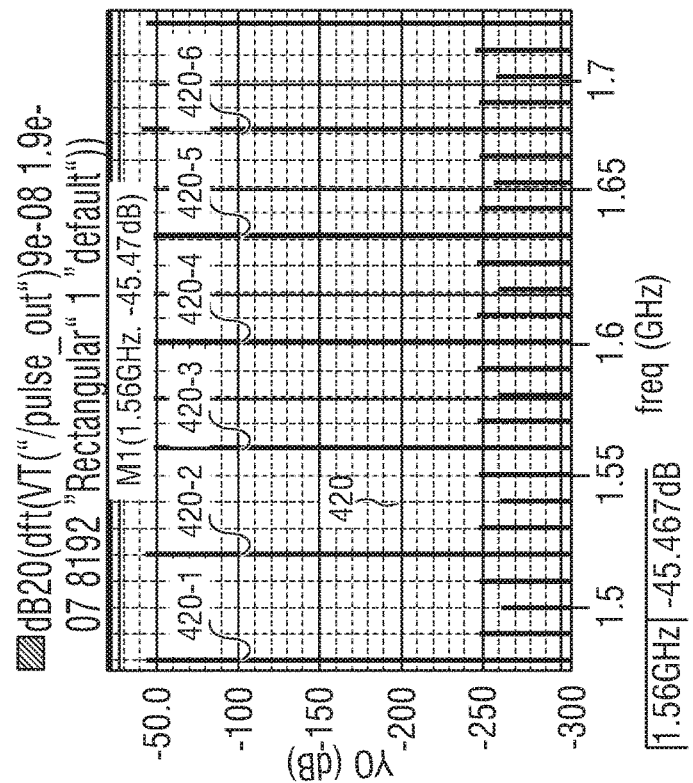
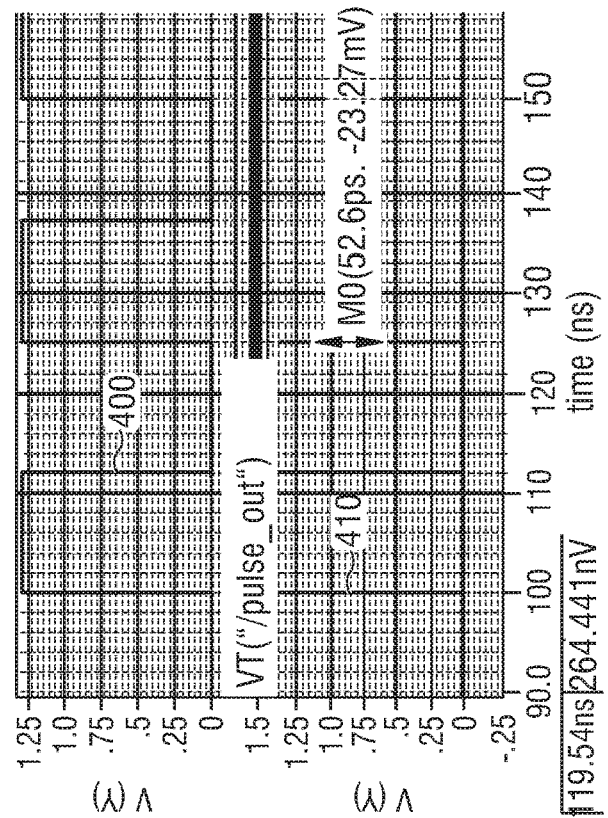
FIG. 4a
FIG. 4b
FIG. 4c

SYSTEM AND A METHOD FOR DETERMINING AN IMAGE REJECTION CHARACTERISTIC OF A RECEIVER WITHIN A TRANSCEIVER

CROSS REFERENCE TO RELATED APPLICATIONS

This application claims priority to German Application number 10 2015 110 269.2, filed on Jun. 25, 2015, the contents of which are herein incorporated by reference in its entirety.

FIELD

Examples relate to image rejection self-testing. In particular, some examples relate to systems and methods for determining an image rejection characteristic of a receiver within a transceiver using a common local oscillator. Some examples relate to systems and methods for determining an image rejection characteristic of a Global Navigation Satellite System (GNSS) receiver.

BACKGROUND

Built-in self-tests may be used for production testing, monitoring or re-calibration of transceivers. For a transceiver using a common local oscillator signal for providing a down-mixed signal and an up-mixed signal, e.g., a transceiver comprising a common frequency synthesizer to provide the local oscillator signal used in the receiver for providing the down-mixed signal (e.g. based on a received signal) and in the transmitter for providing the up-mixed signal (e.g. based on a transmit signal or a baseband signal), a test signal for self-testing may be generated by amplitude modulation of the local oscillator signal. The frequency spectrum of the generated test signal has two sidebands, which are symmetric to the carrier frequency (i.e. the frequency of the local oscillator signal). Many parameters of the transceiver may be tested by adjusting the modulation frequency of the so generated test signal. For example, gain, frequency response and linearity of the receiver may be tested. Image rejection describes the receiver's ability to reject signals at its image frequency, i.e., a frequency being equidistant to the receiver's intermediate frequency but opposite to the desired frequency. The test signal generated conventionally comprises a pair of sideband tones having the same frequency offset to the frequency of the local oscillator signal, so that they act as image to each other (with respect to the frequency of the local oscillator signal). Hence, an image rejection characteristic of the receiver cannot be tested with the test signal since the test signal itself comprises image components.

For example, for a GNSS receiver using the Global Positioning System (GPS), the GLObal NAvigation Satellite System (GLONASS), the Galileo system or the BeiDou system, image rejection is an important aspect. However, providing an internal (built-in) self-test for the image rejection characteristic of the GNSS receiver is conventionally not possible since systems incorporating the GNSS receiver do conventionally not comprise a transmit stage.

Hence, there may be a desire for improved image rejection testing for a receiver within a transceiver or a receiver.

BRIEF DESCRIPTION OF THE DRAWINGS

Some examples of apparatuses and/or methods will be described in the following by way of example only, and with reference to the accompanying figures, in which

FIG. 4a illustrates an example of an input signal for a frequency multiplier;

FIG. 4b illustrates an example of an output signal provided by a frequency multiplier;

FIG. 4c illustrates an example of a spectrum of the output signal illustrated in FIG. 4b;

DETAILED DESCRIPTION

Figure 1:
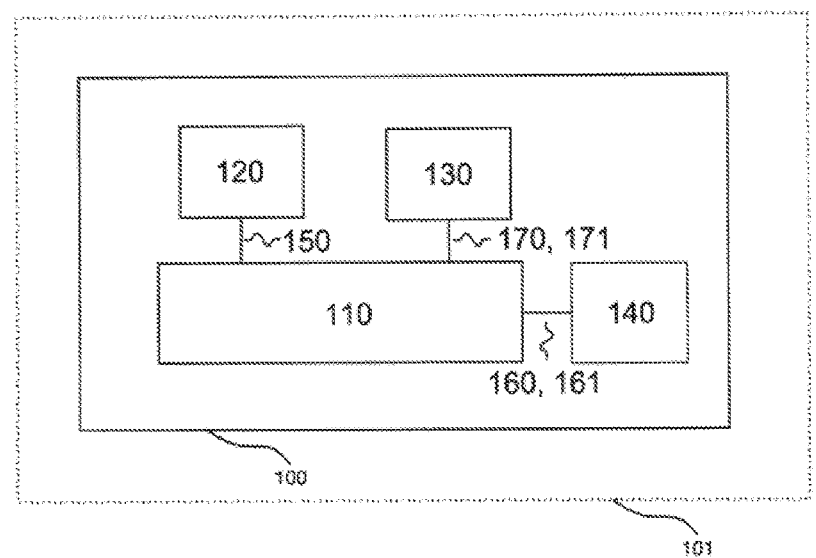
FIG. 1 illustrates an example of a system for determining an image rejection characteristic of a receiver within a transceiver.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some examples thereof are shown by way of example in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular examples only and is not intended to be limiting of further examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art, unless expressly defined otherwise herein.

In the following, various examples relate to devices (e.g. cell phone, base station) or components (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In these examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1 schematically illustrates an example of a system 100 for determining an image rejection characteristic of a receiver 110 within a transceiver 101. The transceiver 101 uses a common local oscillator 130 to generate a local oscillator signal 170 used for generating a down-mixed signal and an up-mixed signal (e.g. the local oscillator signal 170 is used in the receiver 110 for generating the down-mixed signal and in a transmitter for generating the up-mixed signal).

The system 100 comprises a signal generator 120 to generate a test signal 150. The test signal 150 has a spectral peak, i.e., the frequency spectrum of the test signal 150 comprises, at a given frequency or a given frequency range, a significantly increased amplitude compared to amplitudes of neighboring frequencies or frequency ranges. The test signal 150 is provided to an input of the receiver 110.

The local oscillator 130 (a common frequency synthesizer for the receiver 110 and a transmitter of the transceiver 101) supplies the local oscillator signal 170 to the receiver 110. The local oscillator signal 170 has a frequency with an offset from a center frequency of the spectral peak of the test signal 150. The center frequency of the spectral peak may, for example, be understood as the arithmetic mean or the geometric mean of a lower cutoff frequency and an upper cutoff frequency of the spectral peak. Accordingly, the frequency of the local oscillator signal 170 may be higher or lower compared to the center frequency of the spectral peak by the amount of the offset.

The receiver 110 down-mixes the test signal 150 using the local oscillator signal 170 in order to generate the down-mixed signal 160. For example, the receiver 110 may comprise one or more mixers to down-convert the test signal 150 to an intermediate frequency (IF) using the local oscillator signal 170. The IF may in some examples be zero (i.e.

0 Hertz (Hz)). Receivers using an IF of zero are known as zero-IF receivers. In some examples, the IF may be a non-zero frequency (e.g. a few MHz). Receivers using a non-zero IF are known as low-IF receivers.

The down-mixed signal 160 is supplied to an analysis unit 140. The analysis unit 140 calculates a first value of a signal characteristic of the down-mixed signal 160 in a first frequency range. The signal characteristic may, e.g., be a signal strength or an energy of the down-mixed signal 160. For example, the analysis unit 140 may determine a Received Signal Strength Indicator (RSSI) for the down-mixed signal. The first frequency range corresponds to a desired signal component of the down-mixed signal 160. For example, the desired signal component may be generated by a mixer of the receiver 110 by subtracting the frequency of the local oscillator signal 170 from the center frequency of test signal's spectral peak. Hence, the desired signal component may have a frequency with a desired offset from the IF of the receiver 110.

The analysis unit further calculates a second value of the signal characteristic of the down-mixed signal 160 in a second frequency range. In some examples, the first frequency range and the second frequency range may have the same width. The second frequency range corresponds to an undesired component of the down-mixed signal 160. For example (continuing the example of the preceding paragraph), the undesired signal component may be generated by the mixer of the receiver 110 such that it has a frequency offset which is the inverse of the frequency offset of the desired signal component with respect to the IF of the receiver 110. That is, the undesired signal component may be the image of the desired signal component with respect to the IF of the receiver 110.

The analysis unit 140 compares the first value of the signal characteristic and the second value of the signal characteristic. By comparing the first value and the second value of the signal characteristic, the analysis unit 140 may allow to determine an image rejection characteristic of the receiver 110. For example, the signal characteristic may be the energy, so that the analysis unit 140 may compare the energy of the down-mixed signal 160 in the first frequency range and the energy of the down-mixed signal 160 in the second frequency range. In some examples, the analysis unit 170 may calculate a ratio of the first value of the signal characteristic and the second value of the signal characteristic. The ratio may be considered as image rejection ratio, which represent the receiver 110's ability to reject the undesired signal component.

The signal generator 120 may allow to generate the test signal 150 independent from the local oscillator signal 170. In particular, the center frequency of the spectral peak may be independent of the frequency of the local oscillator signal 170. Accordingly, a test signal may be supplied to the receiver 110 which is independent of the oscillator signal 170 used for down-mixing of the test signal 150. Accordingly, the system 100 may allow to determine an image rejection characteristic of the receiver 110 which does not depend on the test signal 150. Accordingly, the system 100 may allow image rejection self-testing for a transceiver's receiver.

Generating the test signal 150 via the signal generator 120 may allow to generate a test signal having no image components. In some examples, the test signal 150 omits (does not have) another spectral peak which is mirror-inverted to the spectral peak with respect to the frequency of the local oscillator signal 170. For example, the test signal 150 may comprise a spectral peak having (comprising) a center frequency being higher by an offset compared to the frequency of the local oscillator signal 170, but no spectral peak at a frequency which is lower by the offset compared to the frequency of the local oscillator signal 170. Since the test signal 150 does not have an image component, the test signal 150 may be used to determine an image rejection characteristic of a receiver within a transceiver using a common local oscillator. Hence, the determined image rejection characteristic of the transceiver's receiver may be independent of the test signal. Accordingly, the system 100 may allow image rejection self-testing for a transceiver's receiver.

In some examples, the local oscillator 130 may additionally generate a second oscillator signal 171 comprising a frequency being mirror-inverted to the frequency of the local oscillator signal 170 with respect to the center frequency of the spectral peak of the test signal 150. For example, the frequency of the second local oscillator signal 171 may be higher by an offset compared to the center frequency of the spectral peak, while the frequency of the local oscillator signal 170 may be lower by the offset compared to the center frequency of the spectral peak. That is, the local oscillator signal 170 and the second local oscillator signal 171 may be generated comprising frequencies which are symmetric with respect to the center frequency of the spectral peak. The local oscillator signal 170 may be generated at a first time instant by the local oscillator 130, whereas the second local oscillator signal 171 may be generated at a different second time instant by the local oscillator 130.

The receiver 110 may down-mix the test signal 150 using the second local oscillator signal 171 to generate a second down-mixed signal 161. In some examples, the test signal 150 does not have another spectral peak being mirror-inverted to the spectral peak with respect to the frequency of the local oscillator signal 170, and does not have another spectral peak being mirror-inverted to the spectral peak with respect to the frequency of the second local oscillator signal 171. The analysis unit 140 may calculate a value of the signal characteristic of the second down-mixed signal 161 in the first frequency range. In the foregoing example, the first frequency range and the second frequency range are identical. Accordingly, the analysis unit 140 may determine the image rejection characteristic by comparing the value of the signal characteristic of the down-mixed signal 160 in the first frequency range to the value of the signal characteristic of the second down-mixed signal 161 in the first frequency range.

By using the local oscillator signal 170 and the second local oscillator signal 171, the image rejection characteristic of the receiver 110 may be determined by analyzing signal components in merely the first frequency range. Using two oscillator signals comprising respective frequencies, which are symmetric with respect to the center frequency of the spectral peak, may allow to use one of the down-mixed signal 160 and the second down-mixed signal 161 as the desired signal component in the first frequency range while using the other one as the undesired (image) component in the first frequency range. Accordingly, by comparing the signal characteristics of both signals in the first frequency range, an image rejection characteristic of the receiver 110 may be determined without any additional modification of a conventional receiver's architecture. For both local oscillator signals, a signal strength or a signal energy of the respective down-mixed signal may be determined in the first frequency range. For example, a ratio of the values for the signal characteristic may be calculated by the analysis unit 140 as image rejection characteristic.

The system 100 may comprise one or more additional optional features corresponding to one or more aspects of the proposed concept or one or more examples described below.

Generally speaking, some examples relate to a means for determining an image rejection characteristic of a receiver within a transceiver using a common local oscillator signal. The means for determining the image rejection characteristic comprises a means for generating a test signal having a spectral peak and a means for generating the local oscillator signal comprising a frequency with an offset from a center frequency of the spectral peak. The receiver is configured to down-mix the test signal using the local oscillator signal to generate the down-mixed signal. The means for determining the image rejection characteristic further comprises a means for calculating a first value of a signal characteristic of the down-mixed signal in a first frequency range corresponding to a desired signal component of the down-mixed signal, for calculating a second value of the signal characteristic of the down-mixed signal in a second frequency range corresponding to an undesired signal component of the down-mixed signal, and for comparing the first value and the second value to generate the image rejection characteristic.

Some examples relate to a means for determining an image rejection characteristic of a receiver within a transceiver using a common local oscillator. The means for determining the image rejection characteristic comprises a means for generating a test signal having a spectral peak. The local oscillator is configured to generate a local oscillator signal comprising a frequency with an offset from a center frequency of the spectral peak, and to generate a second local oscillator signal comprising a frequency being mirror-inverted to the frequency of the local oscillator signal with respect to the center frequency of the spectral peak. The receiver is configured to down-mix the test signal using the local oscillator signal to generate a down-mixed signal and to down-mix the test signal using the second local oscillator signal to generate a second down-mixed signal. The means for determining the image rejection characteristic further comprises a means for calculating a value of a signal characteristic of the down-mixed signal and a value of the signal characteristic of the second down-mixed signal in a frequency range corresponding to a desired signal component of the down-mixed signal, and for comparing the value of the signal characteristic of the down-mixed signal and the value of the signal characteristic of the second down-mixed signal to generate the image rejection characteristic.

The means for determining an image rejection characteristic of a receiver may be implemented by a system for determining an image rejection characteristic of a receiver described above or below (e.g. FIG. 1). The means for generating a test signal may be implemented by a signal generator described above or below (e.g. FIG. 1). The means for calculating the first value of a signal characteristic, for calculating the second value of the signal characteristic and for comparing the first value and the second value may be implemented by an analysis unit described above or below (e.g. FIG. 1). The means for calculating the value of the signal characteristic of the down-mixed signal, for calculating the value of the signal characteristic of the second down-mixed signal and for comparing the value of the signal characteristic of the down-mixed signal and the value of the signal characteristic of the second down-mixed signal may be implemented by an analysis unit described above or below (e.g. FIG. 1).

Figure 2:
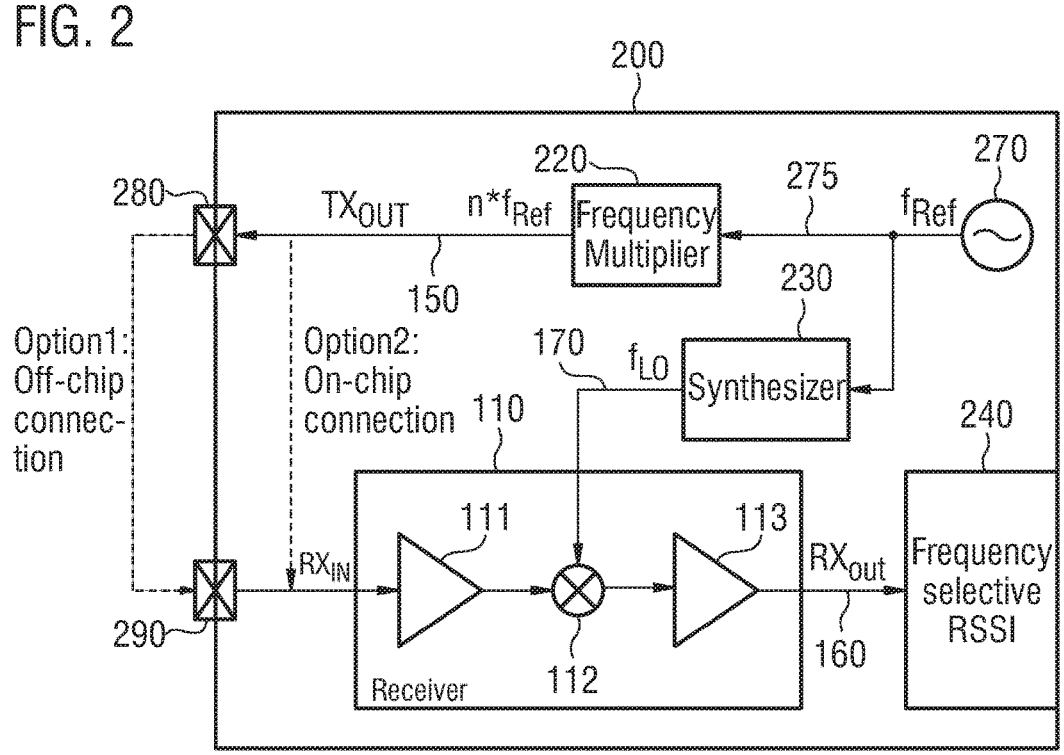
FIG. 2 illustrates another example of a system for determining an image rejection characteristic of a receiver within a transceiver.

FIG. 2 illustrates another example of a system for determining an image rejection characteristic of a receiver 110 within a transceiver 200 and a particular example for the generation of the test signal. In such a transceiver design, all clock signals within the transceiver may be based on a reference frequency $f_{ref}$.

The transceiver 200 comprises a reference local oscillator 270 which generates a reference clock signal 275 comprising the reference frequency $f_{ref}$. The reference clock signal 275 is supplied to a frequency synthesizer 230. The frequency synthesizer 230 uses the reference clock signal 275 to generate a local oscillator signal 170 comprising a frequency $f_{LO}$. For example, the frequency synthesizer 230 may comprise a Voltage-Controlled Oscillator (VCO) which is controlled by a Phase-locked loop (PLL) for generating the local oscillator signal 170 based on the reference clock signal 275.

The local oscillator signal 170 is used by the receiver 110 to generate a down-mixed signal 160 ($RX_{OUT}$) based on an input signal ($RX_{IN}$) supplied to an input of the receiver 110. The receiver 110 comprises a first amplifier 111 to amplify the input signal. Further, the receiver 110 comprises a mixer 112 for down-mixing the amplified input signal to a signal comprising an IF. The signal comprising an IF is supplied to a second amplifier 113 to generate the down-mixed signal 160.

The down-mixed signal 160 is supplied to a processing unit 240. The processing unit 240 (as analysis unit) determines a RSSI of the down-mixed signal for a given frequency range.

The reference clock signal 275 is further supplied to a frequency multiplier 220. The frequency multiplier 220 (as signal generator) generates a test signal 150 having a spectral peak with a center frequency which is a multiple of the frequency $f_{ref}$ of the input reference clock signal 275. For example, the test signal 150 has a spectral peak with a center frequency of $n*f_{ref}$ (n being an integer number). The test signal 150 may further comprise harmonics, i.e., spectral peaks with center frequencies at . . . , $(n-1)*f_{ref}$ . . . , $(n+1)*f_{ref}$) . . . . That is, the frequency multiplier 220 generates the test signal 150 by multiplying a frequency of a reference signal used for the local oscillator of the transceiver 200, i.e., used for the local oscillator of the receiver 110.

The test signal 150 is supplied as input to the receiver 110 for determining an image rejection characteristic of the receiver 110. The transceiver 200 illustrated in FIG. 2 may be implemented on a semiconductor substrate (e.g. a semiconductor die or a semiconductor chip). In some examples, the test signal 150 may be supplied to the receiver 110 via a connection on the semiconductor substrate (e.g. via a conductive path of a semiconductor chip). In some examples, the test signal 150 may be supplied to the receiver 110 via an external connection, i.e., a connection outside the semiconductor chip. For example, the test signal 150 may be supplied to an output 280 of the transceiver 200 as output signal ($TX_{OUT}$) of the transceiver. The output 280 may be coupled to an input 290 of the transceiver (e.g. via a wire line), so that the test signal 150 is supplied to the receiver 110 via the transceiver's input 290.

For determining the image rejection characteristic of the receiver 110, the RSSI of the down-mixed signal 160 may be determined for a first frequency range and for a second frequency range, respectively, by the processing unit 240. The processing unit 240 may determine the image rejection characteristic by comparing both RSSI values. Alternatively, the frequency synthesizer 230 may generate a second oscillator signal (comprising a frequency being mirror-inverted to the center frequency of the spectral peak of the test signal 150 with respect to the frequency of the local oscillator signal 170), so that the receiver may generate a second down-mixed signal for the second oscillator signal. The processing unit 240 may determine the RSSI for both down-mixed signals in a common (first) frequency range, and determine the image rejection characteristic by comparing both RSSI values.

In other words, a frequency multiplier may be used to generate a Radio Frequency (RF) test signal which is a multiple of a reference clock or any other suitable digital clock. An arbitrary clock signal (e.g. the reference clock illustrated in FIG. 2) may be fed to the frequency multiplier. The RF frequency of the used harmonic (provided as test signal) may be independent of the receiver's local oscillator frequency.

The system illustrated in FIG. 2 may comprise one or more additional optional features corresponding to one or more aspects of the proposed concept or one or more examples described above or below (e.g. FIG. 1).

Figure 3:
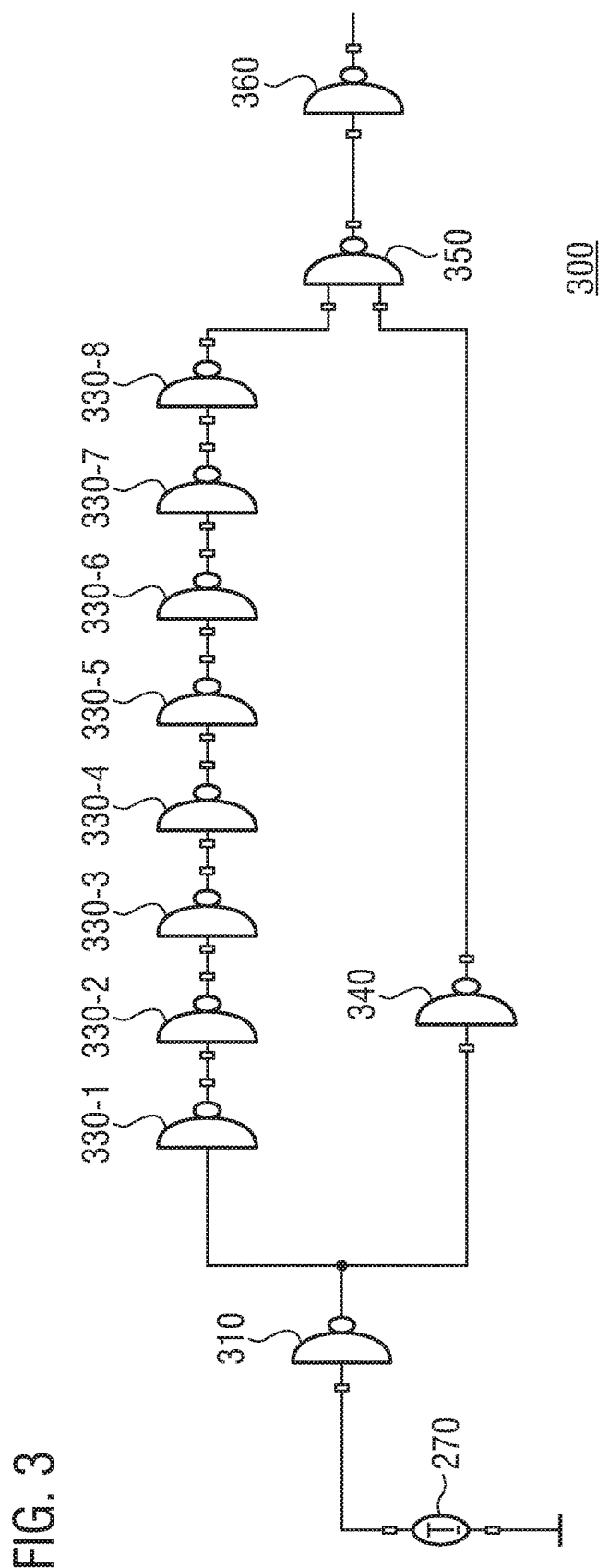
FIG. 3 illustrates an example of a frequency multiplier.

FIG. 3 illustrates an example of a frequency multiplier 300 as it may be used in the example illustrated in FIG. 2. The signal generator 300 is connected to a reference clock oscillator 270. A reference clock signal 275 (reference signal) is supplied to an inverter 310 of the frequency multiplier 300. The inverter 310 may invert a logic level indicated by the reference clock signal 275 and supply the inverted reference clock signal to a node 310. Hence, a signal related to the reference signal is supplied to the node 320.

A first signal path comprising an even number of serially connected first inverters 330-1, . . . , 330-8 is connected to the node 310 and a first input of a NAND-gate 350. The first signal path is not limited to an implementation comprising eight first inverters 330-1, . . . , 330-8 as illustrated in FIG. 3. The first signal path may comprise any even number of inverters.

A second parallel signal path comprising a second inverter 340 is connected to the node and a second input of a NAND-gate 350. The second signal path is not limited to an implementation comprising a single second inverter 340 as illustrated in FIG. 3. The first signal path may comprise any uneven number of inverters.

The NAND-gate 350 provides at its output a signal having spectral components at frequencies which are multiples of the frequency of the reference clock signal 275. That is, the NAND-gate 350 may provide a signal containing harmonics of the reference clock signal 275. The signal generator 300 comprises another inverter 360 to invert the signal provided by the NAND-gate 350. The inverted signal may be provided as the test signal 150.

The frequency multiplier 300 may comprise one or more additional optional features corresponding to one or more aspects of the proposed concept or one or more examples described above or below.

FIG. 4a illustrates an example of an input signal 400 for a frequency multiplier (e.g. frequency multiplier 300 illustrated in FIG. 3). For example, FIG. 4a may illustrate an example of the reference clock signal 275. The input signal 400 comprises equidistant rectangular pulses having a duration of approx. 12 nanoseconds (ns). However, an input signal for a frequency multiplier may comprise pulses having any duration.

FIG. 4b illustrates an example of an output signal 410 provided by a frequency multiplier (e.g. frequency multiplier 300 illustrated in FIG. 3). For example, the output signal 410 may be provided as the test signal 150. The output signal 410 is based on the input signal 400 illustrated in FIG. 4a. The output signal 410 comprises equidistant rectangular pulses. An amplitude of the pulses of the output signal 410 is substantially equal to an amplitude of the pulses of the input signal 400. Compared to the duration of the pulses of the input signal 400, the duration of the pulses of the output signal 410 is significantly reduced. In other words, output signal 410 may comprise narrow pulses which are clocked with the reference clock (e.g. reference clock signal 275) and contain all harmonics of the reference clock with nearly equal amplitude. The amplitude of the harmonics may depend on the pulse length and the supply voltage.

FIG. 4c illustrates an example of a spectrum 420 of the output signal 410 illustrated in FIG. 4b. The spectrum 420 illustrates that the output signal 410 comprises equidistant spectral peaks 420-1, . . . , 420-6. The spectral peaks 420-1, . . . , 420-6 are separated by approx. 50 MHz. The amplitudes of the spectral peaks 420-1, . . . , 420-6 are significantly increased to amplitudes of spectral components at neighboring frequencies or frequency ranges. The output signal 410 may be used to determine an image rejection characteristic of a receiver. In particular, a frequency of a local oscillator signal used for down-mixing in the receiver may be chosen independent of center frequencies of the spectral peaks. Accordingly, the output signal 410 may be provided such that it does not contain image components. For example, the output signal 410 may be provided such that adjacent spectral peaks (e.g. spectral peaks 420-3 and 420-4) are not provided at equidistant frequencies with respect to the frequency of the local oscillator signal. In other words, the output signal 410 may be provided such that adjacent spectral peaks are not provided symmetric with respect to the frequency of the local oscillator signal.

Figure 5:
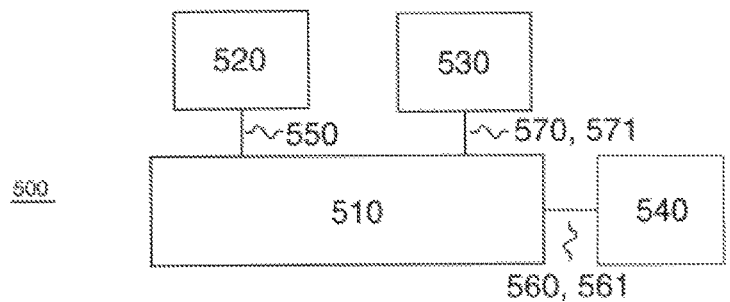
FIG. 5 illustrates an example of a system for determining an image rejection characteristic of a Global Navigation Satellite System receiver.

An example of a system 500 for determining an image rejection characteristic of a Global Navigation Satellite System receiver 510 is schematically illustrated in FIG. 5. The GNSS receiver 510 comprises a local oscillator 530 to generate a local oscillator signal 570 used for generating a down-mixed signal 560 (e.g. the GNSS receiver 510 comprises a mixer to down-convert an input signal to the down-mixed signal 560 using the local oscillator signal 570). The system 500 for the GNSS receiver 510 may be structured similar to the system 100 for a receiver 110 of a transceiver 101.

The system 500 comprises a signal generator 520 to generate a test signal 550. The test signal 550 has a spectral peak. The test signal 550 is supplied to an input of the GNSS receiver 510. The local oscillator 530 supplies the local oscillator signal 570 to the GNSS receiver 510. The local oscillator signal 570 has a frequency with an offset from a center frequency of the spectral peak. The GNSS receiver 510 down-mixes the test signal 550 using the local oscillator signal 570 in order to generate the down-mixed signal 560. For example, the GNSS receiver 510 may comprise one or more mixers to down-convert the test signal 550. In some examples, the GNSS receiver 510 may be a zero-IF receiver. In some examples, the GNSS receiver 510 may be a low-IF receiver.

The down-mixed signal 560 is supplied to an analysis unit 540. The analysis unit 540 calculates a first value of a signal characteristic of the down-mixed signal 160 in a first frequency range. The first frequency range corresponds to a desired signal component of the down-mixed signal 560. The analysis unit further calculates a second value of the signal characteristic of the down-mixed signal 560 in a second frequency range. The second frequency range corresponds to an undesired component of the down-mixed signal 560.

The analysis unit 540 compares the first value of the signal characteristic and the second value of the signal characteristic. By comparing the first value and the second value of the signal characteristic, the analysis unit 540 may allow to determine an image rejection characteristic of the GNSS receiver 510. For example, the signal characteristic may be an energy of the down-mixed signal 560, so that the analysis unit 540 may compare the energy of the down-mixed signal 560 in the first frequency range and the energy of the down-mixed signal 560 in the second frequency range. In some examples, the analysis unit 540 may calculate a ratio of the first value of the signal characteristic and the second value of the signal characteristic. The ratio may be considered as image rejection ratio, which represent the GNSS receiver 510's ability to reject the undesired signal component.

The signal generator 520 may allow to generate the test signal 550 independent from the local oscillator signal 570. In particular, the center frequency of the spectral peak may be independent of the frequency of the local oscillator signal 570. Accordingly, a test signal may be supplied to the GNSS receiver 510 which is independent of the oscillator signal 570 used for down-mixing of the test signal 550. Accordingly, the system 550 may allow to determine an image rejection characteristic of the GNSS receiver 510 which does not depend on the test signal 550. Hence, the system 500 may allow image rejection self-testing for a GNSS receiver.

Generating the test signal 550 via the signal generator 520 may allow to generate a test signal having no image components. In some examples, the test signal 550 omits (does not have) another spectral peak being mirror-inverted to the spectral peak with respect to the frequency of the local oscillator signal 570. For example, the test signal 550 may comprise a spectral peak having a center frequency being higher by an offset compared to the frequency of the local oscillator signal 570, but no spectral peak at a frequency which is lower by the offset compared to the frequency of the local oscillator signal 170. Since the test signal 550 does not have an image component, the test signal 550 may be used to determine an image rejection characteristic of the GNSS receiver. Hence, the determined image rejection characteristic of the GNSS receiver may be independent of the test signal. Accordingly, the system 100 may allow image rejection self-testing for a GNSS receiver.

Similar to system 100 illustrated in FIG. 1, the local oscillator 530 may, in some examples, additionally generate a second oscillator signal 571 having a frequency being mirror-inverted to frequency of the local oscillator signal 570 with respect to the center frequency of the spectral peak of the test signal 550. The local oscillator signal 570 may be generated at a first time instant by the local oscillator 530, whereas the second local oscillator signal 571 may be generated at a different second time instant by the local oscillator 530.

The GNSS receiver 510 may down-mix the test signal 550 using the second local oscillator signal 571 to generate a second down-mixed signal 561. The analysis unit 540 may calculate a value of the signal characteristic of the second down-mixed signal 561 in the first frequency range (i.e. the first frequency range and the second frequency range are identical). Accordingly, the analysis unit 540 may calculate the image rejection characteristic by comparing the value of the signal characteristic of the down-mixed signal 560 in the first frequency range to the value of the signal characteristic of the second down-mixed signal 561 in the first frequency range.

By using the local oscillator signal 570 and the second local oscillator signal 571, the image rejection characteristic of the GNSS receiver 510 may be determined by analyzing signal components in merely the first frequency range. Using two oscillator signals having respective frequencies, which are symmetric with respect to the center frequency of the spectral peak, may allow to use one of the down-mixed signal 560 and the second down-mixed signal 561 as the desired signal component in the first frequency range while using the other one as the undesired (image) component in the first frequency range. Accordingly, by comparing the signal characteristics of both signals in the first frequency range, an image rejection characteristic of the GNSS receiver 510 may be determined without any additional modification of a conventional GNSS receiver's architecture. For both local oscillator signals, a signal strength or a signal energy of the respective down-mixed signal may be calculated in the first frequency range. For example, a ratio of the values for the signal characteristic may be determined by the analysis unit 540 as image rejection characteristic.

The system 500 may comprise one or more additional optional features corresponding to one or more aspects of the proposed concept or one or more examples described above or below (e.g. FIGS. 1 to 4).

Generally speaking, some examples relate to a means for determining an image rejection characteristic of a Global Navigation Satellite System receiver. The means for determining the image rejection characteristic comprises a means for generating a test signal having a spectral peak and a means for generating the local oscillator signal having a frequency with an offset from a center frequency of the spectral peak. The receiver is configured to down-mix the test signal using the local oscillator signal to generate the down-mixed signal. The means for determining the image rejection characteristic further comprises a means for calculating a first value of a signal characteristic of the down-mixed signal in a first frequency range corresponding to a desired signal component of the down-mixed signal, for calculating a second value of the signal characteristic of the down-mixed signal in a second frequency range corresponding to an undesired signal component of the down-mixed signal, and for comparing the first value and the second value to generate the image rejection characteristic.

Some examples relate to a means for determining an image rejection characteristic of a Global Navigation Satellite System receiver. The means for determining the image rejection characteristic comprises a means for generating a test signal having a spectral peak. The local oscillator is configured to generate a local oscillator signal having a frequency with an offset from a center frequency of the spectral peak, and to generate a second local oscillator signal having a frequency being mirror-inverted to the frequency of the local oscillator signal with respect to the center frequency of the spectral peak. The receiver is configured to down-mix the test signal using the local oscillator signal to generate a down-mixed signal and to down-mix the test signal using the second local oscillator signal to generate a second down-mixed signal. The means for determining the image rejection characteristic further comprises a means for calculating a value of a signal characteristic of the down-mixed signal and a value of the signal characteristic of the second down-mixed signal in a frequency range corresponding to a desired signal component of the down-mixed signal, and for comparing the value of the signal characteristic of the down-mixed signal and the value of the signal characteristic of the second down-mixed signal to generate the image rejection characteristic.

The means for determining an image rejection characteristic of a Global Navigation Satellite System receiver may be implemented by a system for determining an image rejection characteristic of a Global Navigation Satellite System receiver described above or below (e.g. FIG. 5). The means for generating a test signal may be implemented by a signal generator described above or below (e.g. FIG. 5). The means for generating the local oscillator signal may be implemented by a local oscillator described above or below (e.g. FIG. 5). The means for calculating the first value of a signal characteristic, for calculating the second value of the signal characteristic and for comparing the first value and the second value may be implemented by an analysis unit described above or below (e.g. FIG. 5). The means for calculating the value of the signal characteristic of the down-mixed signal, for calculating the value of the signal characteristic of the second down-mixed signal and for comparing the value of the signal characteristic of the down-mixed signal and the value of the signal characteristic of the second down-mixed signal may be implemented by an analysis unit described above or below (e.g. FIG. 5).

Figure 6:
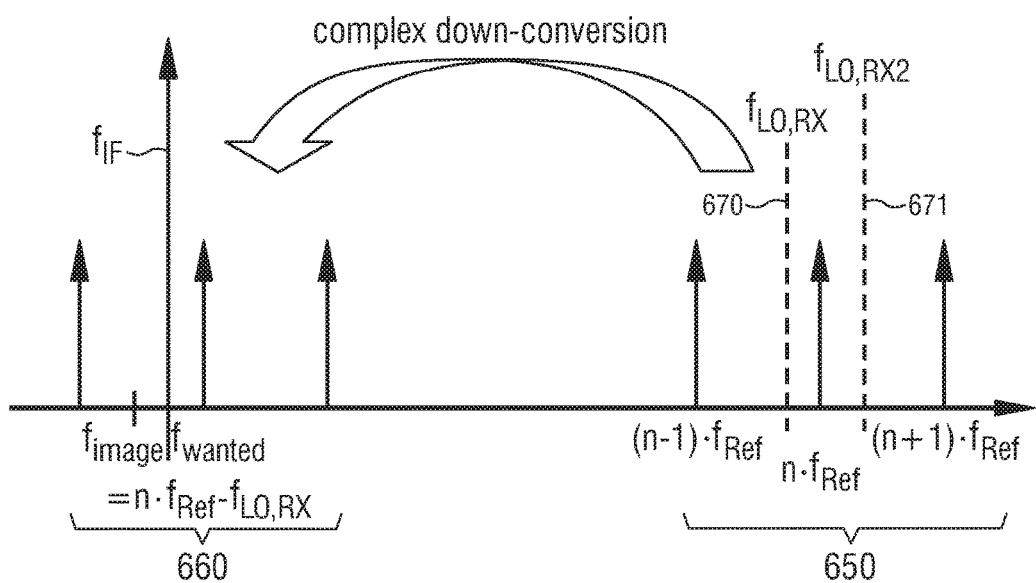
FIG. 6 illustrates an example of a spectrum of a test signal.

FIG. 6 illustrates an example of a spectrum of a test signal 650 according to examples described herein (e.g. test signal 150 or test signal 550). The example of a test signal 650 comprises at least three spectral peaks at frequencies $(n-1)*f_{ref}$, $n*f_{ref}$ and $(n+1)*f_{ref}$. That is, the test signal 650 may comprise a plurality of spectral peaks. For example, the test signal 650 may be generated by frequency multiplier 220 illustrated in FIG. 2.

A local oscillator signal 670 comprising a frequency $f_{LO,RX}$ may be used in a receiver (e.g. comprising a mixer) to generate a down-mixed signal 660. The down-mixed signal 660 comprises at least three spectral peaks at frequency $(n-1)*f_{ref}-f_{LO,RX}$, $n*f_{ref}-f_{LO,RX}$ and $(n+1)*f_{ref}-f_{LO,RX}$.

The spectral peak at the frequency $f_{wanted}=n*f_{ref}-f_{LO,RX}$ may be an example for a desired signal component of the down-converted signal 660. By down-mixing the spectral peak at the frequency $n*f_{ref}$, a receiver (e.g. a mixer of the receiver) may further generate a signal component in the down-mixed signal 660 at a frequency $f_{image}$. The frequency $f_{image}$ is mirror-inverted to the frequency $f_{wanted}$ of the desired image component with respect to an IF at $f_{IF}$ of the receiver (e.g. zero-IF or low-IF).

It is evident from FIG. 6 that the test signal 650 does not comprise a spectral peak which is symmetric to the spectral peak at $n*f_{ref}$ with respect to the frequency $f_{LO,RX}$ of the local oscillator signal. Accordingly, an image signal component at the frequency $f_{image}$ is related to characteristics of the receiver but not to the test signal 650. Hence, image rejection characteristics of the receiver may be determined without limitations due to the test signal.

Alternatively, a second local oscillator signal having a frequency $f_{LO,RX2}$ may be used in the receiver to provide a second down-converted signal. The frequency $f_{LO,RX2}$ of the second local oscillator signal 671 comprises a mirror-inverted offset from the spectral peak at $n*f_{ref}$ compared to local oscillator signal 670. Accordingly, down-mixing the spectral peak in the receiver provides a desired spectral peak at $n*f_{ref}-f_{LO,RX2}=f_{image}$ and an undesired component at $f_{wanted}$. By comparing the value of the signal characteristic (e.g. signal strength or signal energy) of the desired signal component of the down-converted signal 660 at $f_{wanted}$ and the value of the signal characteristic of the undesired signal component of the second down-converted signal at $f_{wanted}$, an image rejection characteristic of the receiver at $f_{wanted}$ may be determined. For example, a ratio of the values of the signal characteristic may be calculated.

In other words, with appropriate setting of the local oscillator frequency, one of the harmonics may reside inside the receive (RX) bandwidth and may be detected by an analysis unit (e.g. by baseband RSSI detection as illustrated in FIG. 2). There may be no signal content at the image frequency of the used harmonic. Thus, the image rejection may be determined without limitations due to the test signal. For example, the image rejection may be measured by programming the receiver's local oscillator frequency to $f_{LO,RX1}=n*f_{REF}-f_{wanted}$ and to $f_{LO,RX2}=n*f_{REF}+f_{wanted}$. With both settings, the signal strength may be measure at $f_{wanted}$. The ratio of both signal strengths may be the image rejection of the receiver.

Figure 7:
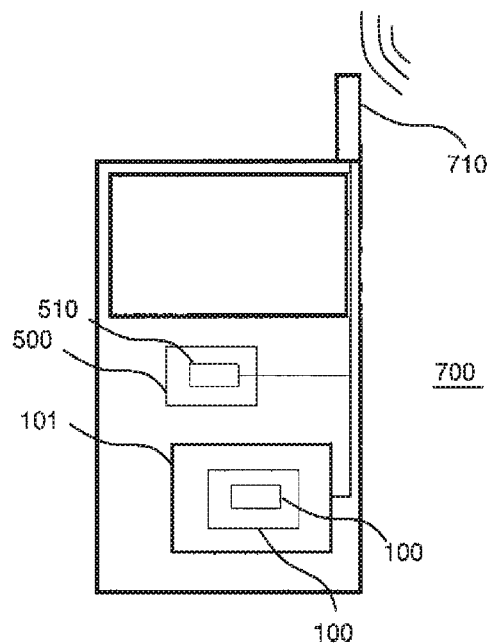
FIG. 7 illustrates an example of a mobile communications device comprising a system for determining an image rejection characteristic of a receiver within a transceiver and/or a system for determining an image rejection characteristic of a Global Navigation Satellite System receiver.

An example of an implementation using image rejection characteristic determination according to one or more aspects of the proposed concept or one or more examples described above is illustrated in FIG. 7. FIG. 7 schematically illustrates an example of a mobile communications device or mobile phone or user equipment 700 comprising a system 100 for determining an image rejection characteristic of a receiver 110 within a transceiver 101 according to an example described herein and/or a system 500 for determining an image rejection characteristic of a Global Navigation Satellite System receiver 510 according to an example described herein. An antenna element 710 of the mobile communications device 700 may be coupled to the transceiver 101 and/or the Global Navigation Satellite System receiver 510. To this end, mobile communications devices may be provided allowing image rejection self-testing of the transceiver's receiver and/or the Global Navigation Satellite System receiver. For example, for a mobile communications device 700 using GSM technology requiring excellent image rejection, image rejection characteristics of the receiver 110 may be determined repetitively during its product lifetime in order to detect a need for readjustment of the receiver's settings. Accordingly, an image rejection ability of the receiver 110 may be readjusted if needed in order to assure reliable GSM functionality of the mobile communications device 700.

Figure 8:
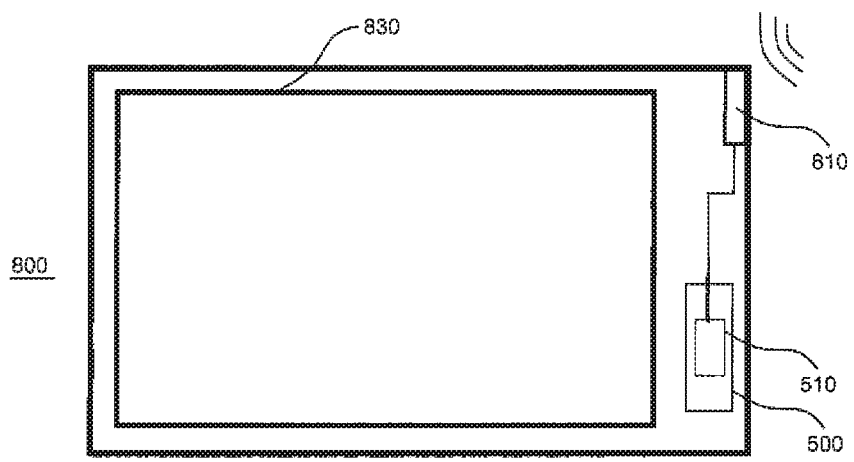
FIG. 8 illustrates a navigation device comprising a system for determining an image rejection characteristic of a Global Navigation Satellite System receiver.

Another example of an implementation using image rejection characteristic determination according to one or more aspects of the proposed concept or one or more examples described above is illustrated in FIG. 8, which schematically illustrates an example of a navigation device 800 comprising a system 500 for determining an image rejection characteristic of a Global Navigation Satellite System receiver 510 according to an example described herein. An antenna element 810 of the navigation device 800 may be coupled to the Global Navigation Satellite System receiver 510. The navigation system may comprise further optional elements like, e.g., display 830 (e.g. a touch display) or input buttons (not illustrated). To this end, navigation devices may be provided allowing image rejection self-testing of the Global Navigation Satellite System receiver 510.

Figure 9:
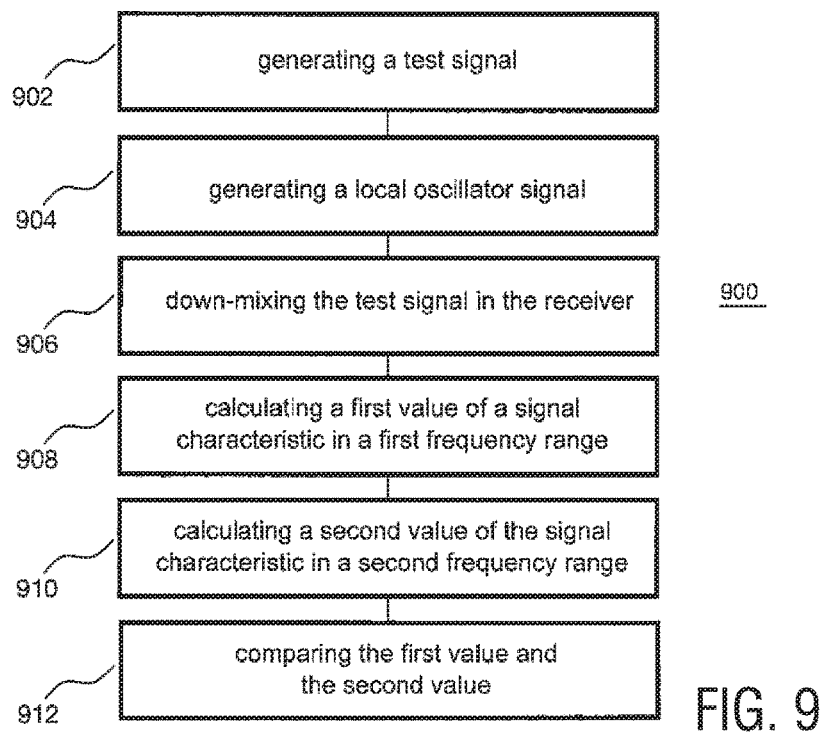
FIG. 9 illustrates a flowchart of an example of a method for determining an image rejection characteristic of a receiver within a transceiver.

An example of a method 900 for determining an image rejection characteristic of a receiver within a transceiver using a common local oscillator is illustrated by means of a flowchart in FIG. 9. The method comprises generating 902 a test signal having a spectral peak. Further, the method comprises generating 904 a local oscillator signal comprising a frequency with an offset from a center frequency of the spectral peak. The method comprises down-mixing 906 the test signal in the receiver using the local oscillator signal to generate a down-mixed signal. Further the method comprises calculating 908 a first value of a signal characteristic of the down-mixed signal in a first frequency range corresponding to a desired signal component of the down-mixed signal and calculating 910 a second value of the signal characteristic of the down-mixed signal in a second frequency range corresponding to an undesired signal component of the down-mixed signal. The method further comprises comparing 912 the first value and the second value to generate the image rejection characteristic.

More details and aspects of the method are mentioned in connection with the proposed concept or one or more examples described above or below (e.g. FIGS. 1-8). The method may comprise one or more additional optional features corresponding to one or more aspects of the proposed concept or one or more examples described above or below.

Figure 10:
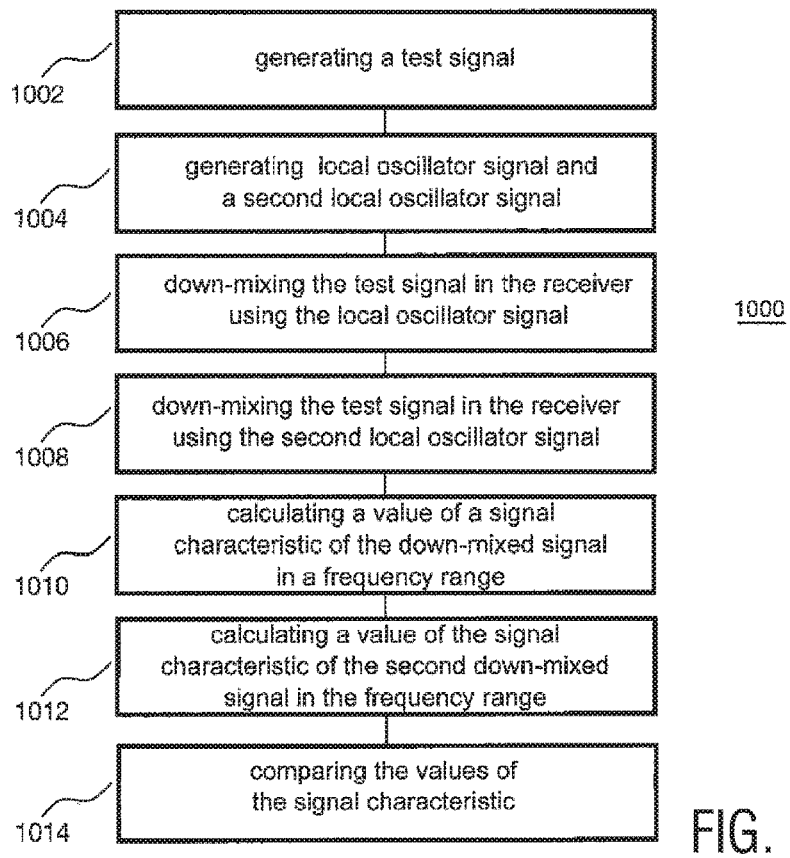
FIG. 10 illustrates a flowchart of another example of a method for determining an image rejection characteristic of a receiver within a transceiver.

An example of another method 1000 for determining an image rejection characteristic of a receiver within a transceiver using a common local oscillator is illustrated by means of a flowchart in FIG. 10. The method comprises generating 1002 a test signal having a spectral peak. Further, the method comprises generating 1004 a local oscillator signal comprising a frequency with an offset from a center frequency of the spectral peak and a second local oscillator signal comprising a frequency being mirror-inverted to the local oscillator signal with respect to the center frequency of the spectral peak. The method comprises down-mixing 1006 the test signal in the receiver using the local oscillator signal to generate a down-mixed signal and down-mixing 1008 the test signal in the receiver using the second local oscillator signal to generate a second down-mixed signal. Further the method comprises calculating 1010 a value of a signal characteristic of the down-mixed signal in a frequency range corresponding to a desired signal component of the down-mixed signal and calculating 1012 a value of the signal characteristic of the second down-mixed signal in the frequency range. The method further comprises comparing 1014 the value of the signal characteristic of the down-mixed signal and the value of the signal characteristic of the second down-mixed signal to generate the image rejection characteristic.

More details and aspects of the method are mentioned in connection with the proposed concept or one or more examples described above or below (e.g. FIGS. 1-8). The method may comprise one or more additional optional features corresponding to one or more aspects of the proposed concept or one or more examples described above or below.

Figure 11:
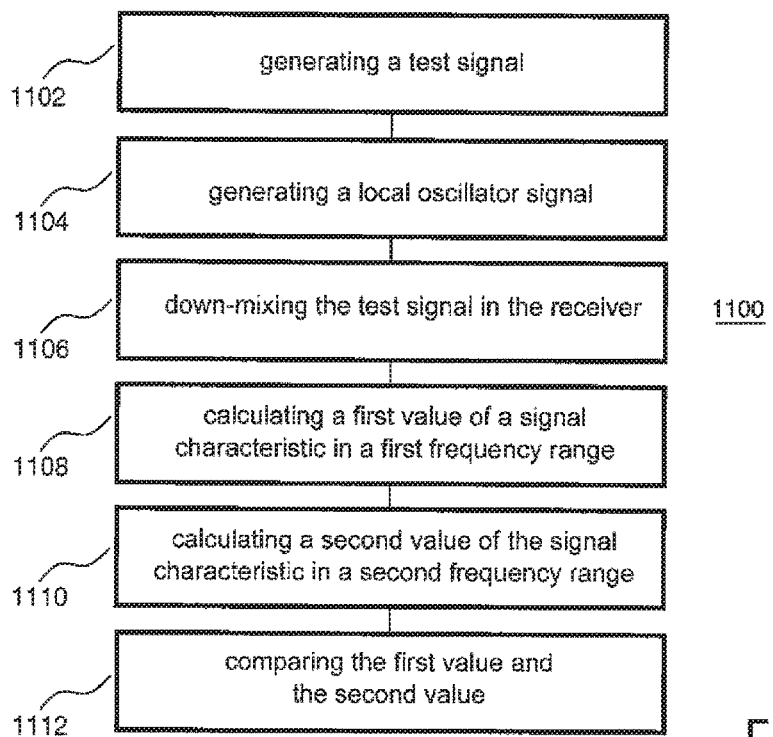
FIG. 11 illustrates a flowchart of an example of a method for determining an image rejection characteristic of a Global Navigation Satellite System receiver.

An example of a method 1100 for determining an image rejection characteristic of a Global Navigation Satellite System receiver is illustrated by means of a flowchart in FIG. 11. The method comprises generating 1102 a test signal having a spectral peak. Further, the method comprises generating 1104 a local oscillator signal comprising a frequency with an offset from a center frequency of the spectral peak. The method comprises down-mixing 1106 the test signal in the receiver using the local oscillator signal to generate a down-mixed signal. Further the method comprises calculating 1108 a first value of a signal characteristic of the down-mixed signal in a first frequency range corresponding to a desired signal component of the down-mixed signal and calculating 1110 a second value of the signal characteristic of the down-mixed signal in a second frequency range corresponding to an undesired signal component of the down-mixed signal. The method further comprises comparing 1112 the first value and the second value to generate the image rejection characteristic.

More details and aspects of the method are mentioned in connection with the proposed concept or one or more examples described above or below (e.g. FIGS. 1-8). The method may comprise one or more additional optional features corresponding to one or more aspects of the proposed concept or one or more examples described above or below.

Figure 12:
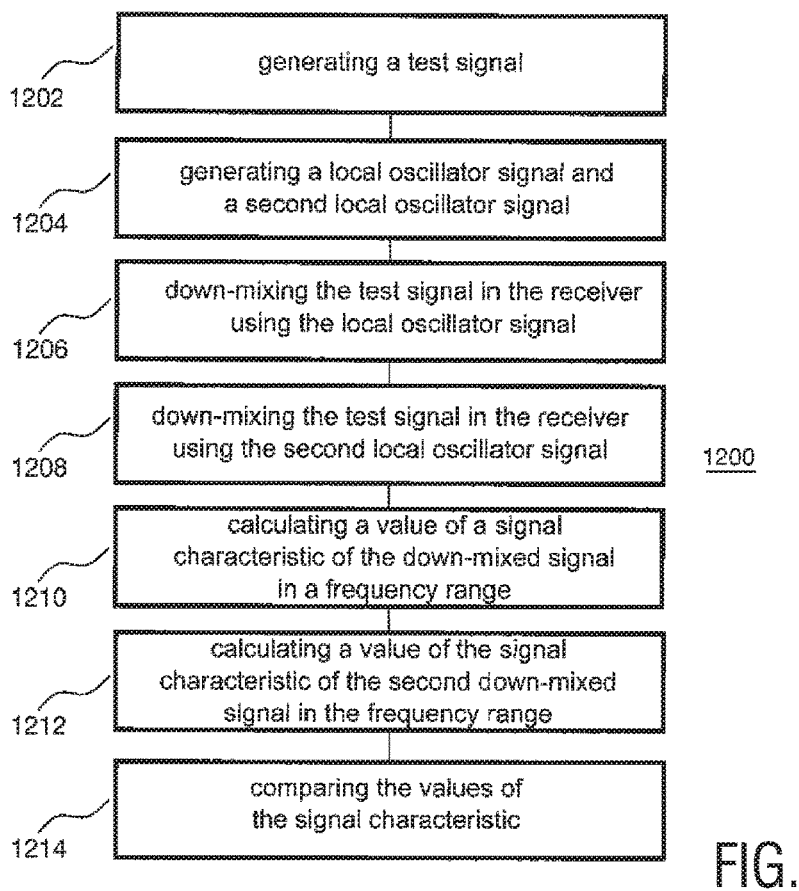
FIG. 12 illustrates a flowchart of another example of a method for determining an image rejection characteristic of a Global Navigation Satellite System receiver.

An example of another method 1200 for determining an image rejection characteristic of a Global Navigation Satellite System receiver is illustrated by means of a flowchart in FIG. 12. The method comprises generating 1202 a test signal having a spectral peak. Further, the method comprises generating 1204 a local oscillator signal comprising a frequency with an offset from a center frequency of the spectral peak and a second local oscillator signal comprising a frequency being mirror-inverted to the local oscillator signal with respect to the center frequency of the spectral peak. The method comprises down-mixing 1206 the test signal in the receiver using the local oscillator signal to generate a down-mixed signal and down-mixing 1208 the test signal in the receiver using the second local oscillator signal to generate a second down-mixed signal. Further the method comprises calculating 1210 a value of a signal characteristic of the down-mixed signal in a frequency range corresponding to a desired signal component of the down-mixed signal and calculating 1212 a value of the signal characteristic of the second down-mixed signal in the frequency range. The method further comprises comparing 1214 the value of the signal characteristic of the down-mixed signal and the value of the signal characteristic of the second down-mixed signal to generate the image rejection characteristic.

More details and aspects of the method are mentioned in connection with the proposed concept or one or more examples described above (e.g. FIGS. 1-8). The method may comprise one or more additional optional features corresponding to one or more aspects of the proposed concept or one or more examples described above.

The examples as described herein may be summarized as follows:

Example 1 is a method for determining an image rejection characteristic of a receiver within a transceiver using a common local oscillator, comprising: generating a test signal having a spectral peak; generating a local oscillator signal comprising a frequency with an offset from a center frequency of the spectral peak; down-mixing the test signal in the receiver using the local oscillator signal to generate a down-mixed signal; calculating a first value of a signal characteristic of the down-mixed signal in a first frequency range corresponding to a desired signal component of the down-mixed signal; calculating a second value of the signal characteristic of the down-mixed signal in a second frequency range corresponding to an undesired signal component of the down-mixed signal; and comparing the first value and the second value to generate the image rejection characteristic.

In example 2, a center frequency of the first frequency range has an offset from an intermediate frequency in the method of example 1, and the second frequency range is mirror-inverted to the first frequency range with respect to the intermediate frequency.

In example 3, the intermediate frequency is zero in the method of example 2.

In example 4, the test signal in the method of any of the preceding examples omits another spectral peak being mirror-inverted to the spectral peak with respect to the frequency of the local oscillator signal.

In example 5, the test signal in the method of example 4 comprises a plurality of equidistant spectral peaks.

In example 6, the first value of the signal characteristic is related to an energy of the down-mixed signal in the first frequency range and the second value of the signal characteristic is related to an energy of the down-mixed signal in the second frequency range in the method of any of the preceding examples.

In example 7, comparing the first value of the signal characteristic and the second value of the signal characteristic in the method of any of the preceding examples comprises calculating a ratio of the first value of the signal characteristic and the second value of the signal characteristic.

Example 8 is a method for determining an image rejection characteristic of a receiver within a transceiver using a common local oscillator, comprising: generating a test signal having a spectral peak, a local oscillator signal comprising a frequency with an offset from a center frequency of the spectral peak and a second local oscillator signal comprising a frequency being mirror-inverted to the local oscillator signal with respect to the center frequency of the spectral peak; down-mixing the test signal in the receiver using the local oscillator signal to generate a down-mixed signal and down-mixing the test signal in the receiver using the second local oscillator signal to generate a second down-mixed signal; calculating a value of a signal characteristic of the down-mixed signal and a value of the signal characteristic of the second down-mixed signal in a frequency range corresponding to a desired signal component of the down-mixed signal; and comparing the value of the signal characteristic of the down-mixed signal and the value of the signal characteristic of the second down-mixed signal to generate the image rejection characteristic.

In example 9, the test signal in the method of example 8 omits another spectral peak being mirror-inverted to the spectral peak with respect to the frequency of the local oscillator signal, and the test signal does not have another spectral peak being mirror-inverted to the spectral peak with respect to the frequency of second local oscillator signal.

In example 10, the test signal in the method of example 9 comprises a plurality of equidistant spectral peaks.

In example 11, the value of the signal characteristic of the down-mixed signal is related to an energy of the down-mixed signal in the frequency range and the value of the signal characteristic of the second down-mixed signal is related to an energy of the second down-mixed signal in the frequency range in the method of any of examples 8 to 10.

In example 12, comparing the value of the signal characteristic of the down-mixed signal and the value of the signal characteristic of the second down-mixed signal in the method of any of examples 8 to 11 comprises calculating a ratio of the value of the signal characteristic of the down-mixed signal and the value of the signal characteristic of the second down-mixed signal.

Example 13 is a method for determining an image rejection characteristic of a Global Navigation Satellite System receiver, comprising: generating a test signal having a spectral peak; generating a local oscillator signal comprising a frequency with an offset from a center frequency of the spectral peak; down-mixing the test signal in the receiver to generate a down-mixed signal; calculating a first value of a signal characteristic of the down-mixed signal in a first frequency range corresponding to a desired signal component of the down-mixed signal; calculating a second value of the signal characteristic of the down-mixed signal in a second frequency range corresponding to an undesired signal component of the down-mixed signal; and comparing the first value and the second value to generate the image rejection characteristic.

In example 14, a center frequency of the first frequency range has an offset from an intermediate frequency in the method of example 13, and the second frequency range is mirror-inverted to the first frequency range with respect to the intermediate frequency.

In example 15, the intermediate frequency in the method of example 14 is zero.

In example 16, the test signal in the method of any of examples 13 to 15 omits another spectral peak being mirror-inverted to the spectral peak with respect to the frequency of the local oscillator signal.

In example 17, the test signal in the method of example 16 comprises a plurality of equidistant spectral peaks.

In example 18, the first value of the signal characteristic is related to an energy of the down-mixed signal in the first frequency range and the second value of the signal characteristic is related to an energy of the down-mixed signal in the second frequency range in the method of any of examples 13 to 17.

In example 19, comparing the first value of the signal characteristic and the second value of the signal characteristic in the method of any of examples 13 to 18 comprises calculating a ratio of the first value of the signal characteristic and the second value of the signal characteristic.

Example 20 is a method for determining an image rejection characteristic of a Global Navigation Satellite System receiver, comprising: generating a test signal having a spectral peak, a local oscillator signal comprising a frequency with an offset from a center frequency of the spectral peak and a second local oscillator signal comprising a frequency being mirror-inverted to the local oscillator signal with respect to the center frequency of the spectral peak; down-mixing the test signal in the receiver using the local oscillator signal to generate the down-mixed signal and down-mixing the test signal in the receiver using the second local oscillator signal to generate a second down-mixed signal; calculating a value of a signal characteristic of the down-mixed signal and a value of the signal characteristic of the second down-mixed signal in a frequency range corresponding to a desired signal component of the down-mixed signal; and comparing the value of the signal characteristic of the down-mixed signal and the value of the signal characteristic of the second down-mixed signal to generate the image rejection characteristic.

In example 21, the test signal in the method of claim 20 omits another spectral peak being mirror-inverted to the spectral peak with respect to the frequency of the local oscillator signal, and the test signal omits another spectral peak being mirror-inverted to the spectral peak with respect to the frequency of the second local oscillator signal.

In example 22, the test signal in the method of claim 21 comprises a plurality of equidistant spectral peaks.

In example 23, the value of the signal characteristic of the down-mixed signal is related to an energy of the down-mixed signal in the frequency range and the value of the signal characteristic of the second down-mixed signal is related to an energy of the second down-mixed signal in the frequency range in the method of any of claims 20 to 22.

In example 24, comparing the value of the signal characteristic of the down-mixed signal and the value of the signal characteristic of the second down-mixed signal in the method of any of claims 20 to 23 comprises calculating a ratio of the value of the signal characteristic of the down-mixed signal and the value of the signal characteristic of the second down-mixed signal.

Example 25 is a computer readable storage medium having stored thereon a program having a program code for performing the method of any of examples 1 to 24, when the program is executed on a computer or processor.

Example 26 is a computer program having a program code configured to perform the method of any of examples 1 to 24, when the computer program is executed on a computer or processor.

Example 27 is a system for determining an image rejection characteristic of a receiver within a transceiver using a common local oscillator, comprising: a signal generator configured to generate a test signal having a spectral peak; wherein the local oscillator is configured to generate a local oscillator signal comprising a frequency with an offset from a center frequency of the spectral peak, wherein the receiver is configured to down-mix the test signal using the local oscillator signal to generate a down-mixed signal, and an analysis unit configured to calculate a first value of a signal characteristic of the down-mixed signal in a first frequency range corresponding to a desired signal component of the down-mixed signal, to calculate a second value of the signal characteristic of the down-mixed signal in a second frequency range corresponding to an undesired signal component of the down-mixed signal, and to compare the first value and the second value to generate the image rejection characteristic.

In example 28, a center frequency of the first frequency range has an offset from an intermediate frequency in the system of example 27, and the second frequency range is mirror-inverted to the first frequency range with respect to the intermediate frequency.

In example 29, the intermediate frequency in the system of example 28 is zero.

In example 30, the test signal in the system of any of the preceding examples omits another spectral peak being mirror-inverted to the spectral peak with respect to the frequency of the local oscillator signal.

In example 31, the test signal in the system of example 30 comprises a plurality of equidistant spectral peaks.

In example 32, the first value of the signal characteristic is related to an energy of the down-mixed signal in the first frequency range and the second value of the signal characteristic is related to an energy of the down-mixed signal in the second frequency range in the system of any of the preceding examples.

In example 33, the analysis unit in the system of any of the preceding examples is configured to compare the first value of the signal characteristic and the second value of the signal characteristic by calculating a ratio of the first value of the signal characteristic and the second value of the signal characteristic.

In example 34, the signal generator in the system of any of the preceding examples comprises a frequency multiplier configured to generate the test signal by multiplying a frequency of a reference signal used for the local oscillator.

In example 35, the signal generator in the system of example 34 comprises: an even number of serially connected first inverters being connected to a node and a first input of a NAND-gate; and an uneven number of serially connected second inverters being connected to the node and a second input of the NAND-gate, wherein a signal related to the reference signal is supplied to the node.

Example 36 is a system for determining an image rejection characteristic of a receiver within a transceiver using a common local oscillator, comprising: a signal generator configured to generate a test signal having a spectral peak; wherein the local oscillator is configured to generate a local oscillator signal comprising a frequency with an offset from a center frequency of the spectral peak and a second local oscillator signal comprising a frequency being mirror-inverted to the frequency of the local oscillator signal with respect to the center frequency of the spectral peak, wherein the receiver is configured to down-mix the test signal using the local oscillator signal to generate a down-mixed signal and to down-mix the test signal using the second local oscillator signal to generate a second down-mixed signal, and an analysis unit configured to calculate a value of a signal characteristic of the down-mixed signal and a value of the signal characteristic of the second down-mixed signal in a frequency range corresponding to a desired signal component of the down-mixed signal, and to compare the values of the signal characteristic of the down-mixed signal and the second down-mixed signal to generate the image rejection characteristic.

In example 37, the test signal in the system of example 36 omits another spectral peak being mirror-inverted to the spectral peak with respect to the frequency of the local oscillator signal, and wherein the test signal omits another spectral peak being mirror-inverted to the spectral peak with respect to the frequency of second local oscillator signal.

In example 38, the test signal in the system of example 37 comprises a plurality of equidistant spectral peaks.

In example 39, the value of the signal characteristic of the down-mixed signal is related to an energy of the down-mixed signal in the frequency range and the value of the signal characteristic of the second down-mixed signal is related to an energy of the second down-mixed signal in the frequency range in the system of any of examples 36 to 38.

In example 40, the analysis unit in the system of any of examples 36 to 39 is configured to compare the value of the signal characteristic of the down-mixed signal and the value of the signal characteristic of the second down-mixed signal by calculating a ratio of the value of the signal characteristic of the down-mixed signal and the value of the signal characteristic of the second down-mixed signal.

In example 41, the signal generator in the system of any of examples 36 to 40 comprises a frequency multiplier configured to generate the test signal by multiplying a frequency of a reference signal used for the local oscillator.

Example 42, the signal generator in the system of example 41 comprises: an even number of serially connected first inverters being connected to a node and a first input of a NAND-gate; and an uneven number of serially connected second inverters being connected to the node and a second input of the NAND-gate, wherein a signal related to the reference signal is supplied to the node.

Example 43 is a system for determining an image rejection characteristic of a Global Navigation Satellite System receiver using a local oscillator, comprising: a signal generator configured to generate a test signal having a spectral peak; wherein the local oscillator is configured to generate a local oscillator signal comprising a frequency with an offset from a center frequency of the spectral peak, wherein the Global Navigation Satellite System receiver is configured to down-mix the test signal using the local oscillator signal to generate the down-mixed signal, and an analysis unit configured to calculate a first value of a signal characteristic of the down-mixed signal in a first frequency range corresponding to a desired signal component of the down-mixed signal, to calculate a second value of the signal characteristic of the down-mixed signal in a second frequency range corresponding to an undesired signal component of the down-mixed signal, and to compare the first value and the second value to generate the image rejection characteristic.

In example 44, a center frequency of the first frequency range has an offset from an intermediate frequency in the system of example 43, and the second frequency range is mirror-inverted to the first frequency range with respect to the intermediate frequency.

In example 45, the intermediate frequency in the system of example 44 is zero.

In example 46, the test signal in the system of any of examples 43 to 45 omits another spectral peak being mirror-inverted to the spectral peak with respect to the frequency of the local oscillator signal.

In example 47, the test signal in the system of example 46 comprises a plurality of equidistant spectral peaks.

In example 48, the first value of the signal characteristic is related to an energy of the down-mixed signal in the first frequency range and the second value of the signal characteristic is related to an energy of the down-mixed signal in the second frequency range in the system of any of examples 43 to 47.

In example 49, the analysis unit in the system of any of examples 43 to 48 is configured to compare the first value of the signal characteristic and the second value of the signal characteristic by calculating a ratio of the first value of the signal characteristic and the second value of the signal characteristic.

In example 50, the signal generator in the system of any of examples 43 to 49 comprises a frequency multiplier configured to generate the test signal by multiplying a frequency of a reference signal used for the local oscillator.

In example 51, the signal generator in the system of example 50 comprises: an even number of serially connected first inverters being connected to a node and a first input of a NAND-gate; and an uneven number of serially connected second inverters being connected to the node and a second input of the NAND-gate, wherein a signal related to the reference signal is supplied to the node.

Example 52 is a system for determining an image rejection characteristic of a Global Navigation Satellite System receiver using a local oscillator, comprising: a signal generator configured to generate a test signal having a spectral peak; wherein the local oscillator is configured to generate a local oscillator signal comprising a frequency with an offset from a center frequency of the spectral peak, and to generate a second local oscillator signal comprising a frequency being mirror-inverted to the frequency of the local oscillator signal with respect to the center frequency of the spectral peak, wherein the receiver is configured to down-mix the test signal using the local oscillator signal to generate a down-mixed signal and to down-mix the test signal using the second local oscillator signal to generate a second down-mixed signal, and an analysis unit configured to calculate a value of a signal characteristic of the down-mixed signal and a value of the signal characteristic of the second down-mixed signal in a frequency range corresponding to a desired signal component of the down-mixed signal, and to compare the values of the signal characteristic of the down-mixed signal and the second down-mixed signal to generate the image rejection characteristic.

In example 53, the test signal in the system of example 52 omits another spectral peak being mirror-inverted to the spectral peak with respect to the frequency of the local oscillator signal, and wherein the test signal omits another spectral peak being mirror-inverted to the spectral peak with respect to the frequency of the second local oscillator signal.

In example 54, the test signal in the system of example 53 comprises a plurality of equidistant spectral peaks.

In example 55, the value of the signal characteristic of the down-mixed signal is related to an energy of the down-mixed signal in the frequency range and the value of the signal characteristic of the second down-mixed signal is related to an energy of the second down-mixed signal in the frequency range in the system of any of examples 52 to 54.

In example 56, the analysis unit in the system of any of examples 52 to 55 is configured to compare the value of the signal characteristic of the down-mixed signal and the value of the signal characteristic of the second down-mixed signal by calculating a ratio of the value of the signal characteristic of the down-mixed signal and the value of the signal characteristic of the second down-mixed signal.

In example 57, the signal generator in the system of any of examples 52 to 56 comprises a frequency multiplier configured to generate the test signal by multiplying a frequency of a reference signal used for the local oscillator.

In example 58, the signal generator in the system of examples 57 comprises: an even number of serially connected first inverters being connected to a node and a first input of a NAND-gate; and an uneven number of serially connected second inverters being connected to the node and a second input of the NAND-gate, wherein a signal related to the reference signal is supplied to the node.

Example 59 is a transceiver using a common local oscillator, comprising a system for determining an image rejection characteristic of a receiver within the transceiver according to any of examples 27 to 42.

In example 60, the transmitter of example 59 further comprises a transmitter configured to generate the up-mixed signal using the local oscillator signal.

Example 61 is a mobile communications device comprising a transceiver according to any of examples 59 or 60 and/or a system for determining an image rejection characteristic of a Global Navigation Satellite System receiver according to any of examples 43 to 58.

In example 62, the mobile communications device of example 61 further comprises at least one antenna coupled to the transceiver and/or the Global Navigation Satellite System receiver.

Example 63 is a navigation device comprising a system for determining an image rejection characteristic of a Global Navigation Satellite System receiver according to any of examples 43 to 58.

Example 64 is a means for determining an image rejection characteristic of a receiver within a transceiver using a common local oscillator, comprising: a means for generating a test signal having a spectral peak; wherein the local oscillator is configured to generate a local oscillator signal comprising a frequency with an offset from a center frequency of the spectral peak, wherein the receiver is configured to down-mix the test signal using the local oscillator signal to generate a down-mixed signal, and a means for calculating a first value of a signal characteristic of the down-mixed signal in a first frequency range corresponding to a desired signal component of the down-mixed signal, for calculating a second value of the signal characteristic of the down-mixed signal in a second frequency range corresponding to an undesired signal component of the down-mixed signal, and for comparing the first value and the second value to generate the image rejection characteristic.

In example 65 a center frequency of the first frequency range has an offset from an intermediate frequency in the means of example 64, and the second frequency range is mirror-inverted to the first frequency range with respect to the intermediate frequency.

Example 66 is a means for determining an image rejection characteristic of a receiver within a transceiver using a common local oscillator, comprising: a means for generating a test signal having a spectral peak; wherein the local oscillator is configured to generate a local oscillator signal comprising a frequency with an offset from a center frequency of the spectral peak, and to generate a second local oscillator signal comprising a frequency being mirror-inverted to the frequency of the local oscillator signal with respect to the center frequency of the spectral peak, wherein the receiver is configured to down-mix the test signal using the local oscillator signal to generate a down-mixed signal and to down-mix the test signal using the second local oscillator signal to generate a second down-mixed signal, and a means for calculating a value of a signal characteristic of the down-mixed signal and a value of the signal characteristic of the second down-mixed signal in a frequency range corresponding to a desired signal component of the down-mixed signal, and for comparing the value of the signal characteristic of the down-mixed signal and the value of the signal characteristic of the second down-mixed signal to generate the image rejection characteristic.

In example 67, the test signal in the means of example 66 omits another spectral peak being mirror-inverted to the spectral peak with respect to the frequency of the local oscillator signal, and the test signal omits another spectral peak being mirror-inverted to the spectral peak with respect to the frequency of second local oscillator signal.

Example 68 is a means for determining an image rejection characteristic of a Global Navigation Satellite System receiver using a local oscillator, comprising: a means for generating a test signal having a spectral peak; wherein the local oscillator is configured to generate a local oscillator signal comprising a frequency with an offset from a center frequency of the spectral peak, wherein the Global Navigation Satellite System receiver is configured to down-mix the test signal using the local oscillator signal to generate a down-mixed signal, and a means for calculating a first value of a signal characteristic of the down-mixed signal in a first frequency range corresponding to a desired signal component of the down-mixed signal, for calculating a second value of the signal characteristic of the down-mixed signal in a second frequency range corresponding to an undesired signal component of the down-mixed signal, and for comparing the first value and the second value to generate the image rejection characteristic.

In example 69, a center frequency of the first frequency range has an offset from an intermediate frequency in the means of example 68, and the second frequency range is mirror-inverted to the first frequency range with respect to the intermediate frequency.

Example 70 is a means for determining an image rejection characteristic of a Global Navigation Satellite System receiver using a local oscillator, comprising: a means for generating a test signal having a spectral peak; wherein the local oscillator is configured to generate a local oscillator signal comprising a frequency with an offset from a center frequency of the spectral peak, and to generate a second local oscillator signal comprising a frequency being mirror-inverted to the frequency of the local oscillator signal with respect to the center frequency of the spectral peak, wherein the receiver is configured to down-mix the test signal using the local oscillator signal to generate a down-mixed signal and to down-mix the test signal using the second local oscillator signal to generate a second down-mixed signal, and a means for calculating a value of a signal characteristic of the down-mixed signal and a value of the signal characteristic of the second down-mixed signal in a frequency range corresponding to a desired signal component of the down-mixed signal, and for comparing the value of the signal characteristic of the down-mixed signal and the value of the signal characteristic of the second down-mixed signal to generate the image rejection characteristic.

In example 71, the test signal in the means of example 70 omits another spectral peak being mirror-inverted to the spectral peak with respect to the frequency of the local oscillator signal, and the test signal omits another spectral peak being mirror-inverted to the spectral peak with respect to the frequency of further local oscillator signal.

Examples may further provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

What is claimed is:

1. A method for determining an image rejection characteristic of a receiver within a transceiver using a common local oscillator, comprising:
   generating a test signal having a spectral peak;
   generating a local oscillator signal comprising a frequency with an offset from a center frequency of the spectral peak;
   down-mixing the test signal in the receiver using the local oscillator signal to generate a down-mixed signal;
   calculating a first value of a signal characteristic of the down-mixed signal in a first frequency range corresponding to a desired signal component of the down-mixed signal;
   calculating a second value of the signal characteristic of the down-mixed signal in a second frequency range corresponding to an undesired signal component of the down-mixed signal; and
   comparing the first value and the second value to generate the image rejection characteristic.

2. The method of claim 1, wherein a center frequency of the first frequency range has an offset from an intermediate frequency, and wherein the second frequency range is mirror-inverted to the first frequency range with respect to the intermediate frequency.

3. The method of claim 2, wherein the intermediate frequency is zero.

4. The method of claim 1, wherein the test signal omits another spectral peak being mirror-inverted to the spectral peak with respect to the frequency of the local oscillator signal.

5. The method of claim 4, wherein the test signal comprises a plurality of equidistant spectral peaks.

6. The method of claim 1, wherein the first value of the signal characteristic is related to an energy of the down-mixed signal in the first frequency range and the second value of the signal characteristic is related to an energy of the down-mixed signal in the second frequency range.

7. The method of claim 1, wherein comparing the first value of the signal characteristic and the second value of the signal characteristic comprises calculating a ratio of the first value of the signal characteristic and the second value of the signal characteristic.

8. A method for determining an image rejection characteristic of a receiver within a transceiver using a common local oscillator, comprising:
   generating a test signal having a spectral peak, a local oscillator signal comprising a frequency with an offset from a center frequency of the spectral peak and a second local oscillator signal comprising a frequency being mirror-inverted to the local oscillator signal with respect to the center frequency of the spectral peak;
   down-mixing the test signal in the receiver using the local oscillator signal to generate a down-mixed signal and down-mixing the test signal in the receiver using the second local oscillator signal to generate a second down-mixed signal;
   calculating a value of a signal characteristic of the down-mixed signal and a value of the signal characteristic of the second down-mixed signal in a frequency range corresponding to a desired signal component of the down-mixed signal; and
   comparing the value of the signal characteristic of the down-mixed signal and the value of the signal characteristic of the second down-mixed signal to generate the image rejection characteristic.

9. The method of claim 8, wherein the test signal omits another spectral peak being mirror-inverted to the spectral peak with respect to the frequency of the local oscillator signal, and wherein the test signal does not have another spectral peak being mirror-inverted to the spectral peak with respect to the frequency of second local oscillator signal.

10. The method of claim 9, wherein the test signal comprises a plurality of equidistant spectral peaks.

11. The method of claim 8, wherein the value of the signal characteristic of the down-mixed signal is related to an energy of the down-mixed signal in the frequency range and the value of the signal characteristic of the second down-mixed signal is related to an energy of the second down-mixed signal in the frequency range.

12. The method of claim 8, wherein comparing the value of the signal characteristic of the down-mixed signal and the value of the signal characteristic of the second down-mixed signal comprises calculating a ratio of the value of the signal characteristic of the down-mixed signal and the value of the signal characteristic of the second down-mixed signal.

13. A system for determining an image rejection characteristic of a receiver within a transceiver using a common local oscillator, comprising:
- a signal generator configured to generate a test signal having a spectral peak;
- wherein the local oscillator is configured to generate a local oscillator signal comprising a frequency with an offset from a center frequency of the spectral peak, wherein the receiver is configured to down-mix the test signal using the local oscillator signal to generate a down-mixed signal, and
- an analysis unit configured to calculate a first value of a signal characteristic of the down-mixed signal in a first frequency range corresponding to a desired signal component of the down-mixed signal, to calculate a second value of the signal characteristic of the down-mixed signal in a second frequency range corresponding to an undesired signal component of the down-mixed signal, and to compare the first value and the second value to generate the image rejection characteristic.

14. The system of claim 13, wherein a center frequency of the first frequency range has an offset from an intermediate frequency, and wherein the second frequency range is mirror-inverted to the first frequency range with respect to the intermediate frequency.

15. The system of claim 14, wherein the intermediate frequency is zero.

16. The system of claim 13, wherein the test signal omits another spectral peak being mirror-inverted to the spectral peak with respect to the frequency of the local oscillator signal.

17. The system of claim 16, wherein the test signal comprises a plurality of equidistant spectral peaks.

18. The system of claim 13, wherein the first value of the signal characteristic is related to an energy of the down-mixed signal in the first frequency range and the second value of the signal characteristic is related to an energy of the down-mixed signal in the second frequency range.

19. The system of claim 13, wherein the analysis unit is configured to compare the first value of the signal characteristic and the second value of the signal characteristic by calculating a ratio of the first value of the signal characteristic and the second value of the signal characteristic.

20. The system of claim 13, wherein the signal generator comprises a frequency multiplier configured to generate the test signal by multiplying a frequency of a reference signal used for the local oscillator.

21. A system for determining an image rejection characteristic of a receiver within a transceiver using a common local oscillator, comprising:
- a signal generator configured to generate a test signal having a spectral peak;
- wherein the local oscillator is configured to generate a local oscillator signal comprising a frequency with an offset from a center frequency of the spectral peak and a second local oscillator signal comprising a frequency being mirror-inverted to the frequency of the local oscillator signal with respect to the center frequency of the spectral peak,
- wherein the receiver is configured to down-mix the test signal using the local oscillator signal to generate a down-mixed signal and to down-mix the test signal using the second local oscillator signal to generate a second down-mixed signal, and
- an analysis unit configured to calculate a value of a signal characteristic of the down-mixed signal and a value of the signal characteristic of the second down-mixed signal in a frequency range corresponding to a desired signal component of the down-mixed signal, and to compare the values of the signal characteristic of the down-mixed signal and the second down-mixed signal to generate the image rejection characteristic.

22. The system of claim 21, wherein the test signal omits another spectral peak being mirror-inverted to the spectral peak with respect to the frequency of the local oscillator signal, and wherein the test signal omits another spectral peak being mirror-inverted to the spectral peak with respect to the frequency of second local oscillator signal.

23. The system of claim 22, wherein the test signal comprises a plurality of equidistant spectral peaks.

24. The system of claim 21, wherein the value of the signal characteristic of the down-mixed signal is related to an energy of the down-mixed signal in the frequency range and the value of the signal characteristic of the second down-mixed signal is related to an energy of the second down-mixed signal in the frequency range.

25. The system of claim 21, wherein the signal generator comprises a frequency multiplier configured to generate the test signal by multiplying a frequency of a reference signal used for the local oscillator.

* * * * *